Nov. 29, 1966  F. J. DECKER ET AL  3,288,454
HEAVY-DUTY VEHICLE SEAT
Filed Aug. 26, 1964  2 Sheets-Sheet 1

INVENTORS
FREDERICK J. DECKER
LYMAN CLARK CONNER, DECEASED
BY RUSSELL J. VIS, EXECUTOR

BY
Lynn H Latta
ATTORNEY

Nov. 29, 1966 — F. J. DECKER ET AL — 3,288,454
HEAVY-DUTY VEHICLE SEAT
Filed Aug. 26, 1964 — 2 Sheets-Sheet 2

INVENTORS
FREDERICK J. DECKER
LYMAN CLARK CONNER, DECEASED
BY RUSSELL J. VIS, EXECUTOR

BY Lyman H. Latta
ATTORNEY

United States Patent Office 3,288,454
Patented Nov. 29, 1966

3,288,454
HEAVY-DUTY VEHICLE SEAT
Frederick J. Decker, Pittsford, N.Y., and Lyman Clark Conner, deceased, late of Los Angeles, Calif., by Russell J. Vis, executor, Santa Ana, Calif., assignors to Flexible-Air Seat Corporation, Los Angeles, Calif., a corporation of California
Filed Aug. 26, 1964, Ser. No. 392,334
12 Claims. (Cl. 267—1)

This invention relates to shock-cushioning supports for seats such as driver's seats for trucks, buses, road machines and other vehicles which are used under conditions such as tend to cause driver fatigue from road shocks, etc. The general object of the present invention is to provide an improved pneumatic cushioning support for such seats. More specifically, the invention provides a cushioning seat support:

(1) Wherein cushioning action is derived from vertical movements of a piston within a cylinder in which it is fitted;

(2) Embodying an auxiliary cushioning chamber which provides augmented volume in which air expelled from the cylinder is compressed with a cushioning action of increased softness;

(3) Having means automatically operable upon rebound to effect a pneumatic rebound-checking action which gradually dissipates the rebound effect produced by compression of air in an initial shock-absorbing stroke of the piston;

(4) Having means for adjusting the rate of dissipation of the rebound stroke;

(5) Eliminating the use of flexible diaphragms for confining the shock-cushioning air body;

(6) Having improved dust-shield means enclosing the joint between the relatively movable piston and cylinder components;

(7) Embodying the combination of cylinder, piston and auxiliary cushioning chamber in a relatively compact assembly;

(8) Of rugged and durable construction and readily adaptable to manufacturing techniques;

Other objects and advantages will become apparent in the ensuing specification and appended drawing in which.

Figure 1:
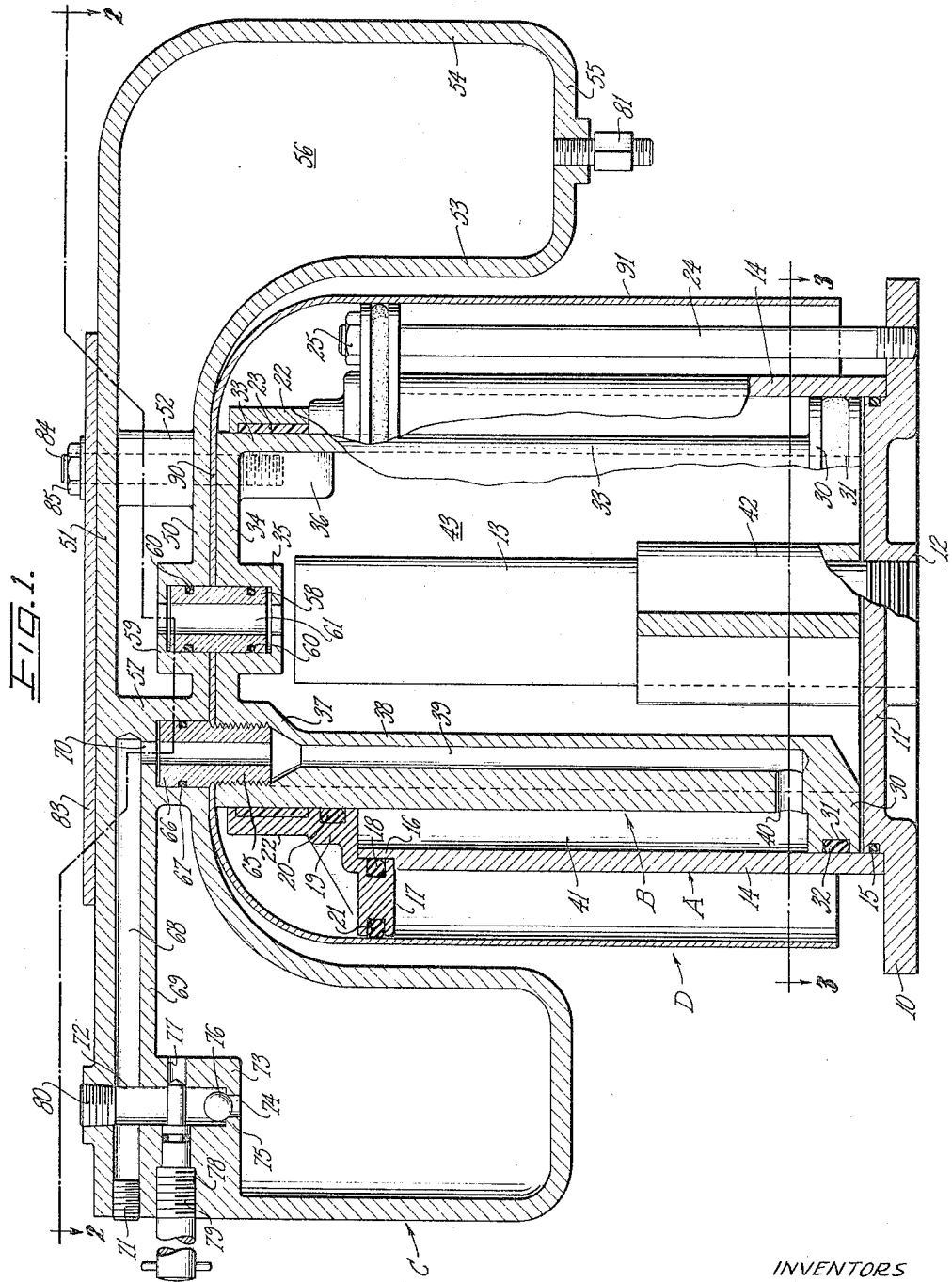
FIG. 1 is a vertical sectional view of a seat support embodying the invention.
Figure 2:
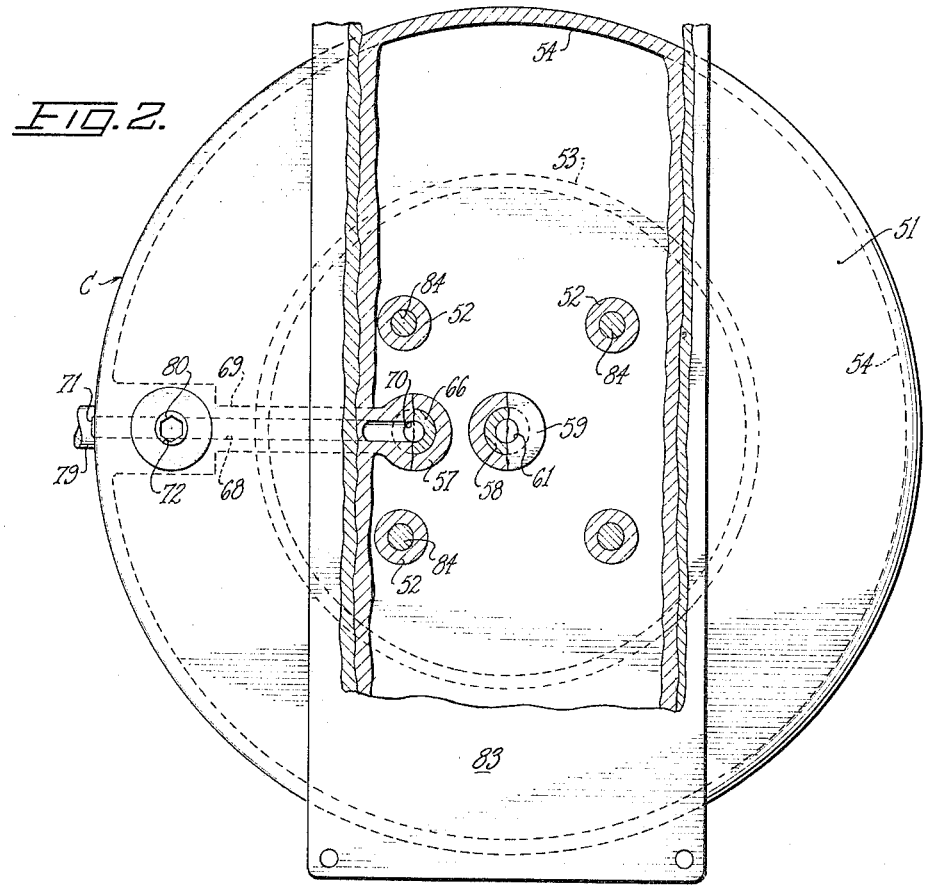
FIG. 2 is a transverse horizontal sectional view of the same taken in several different horizontal planes as indicated by the line 2—2 of FIG. 1.

Referring now to the drawings in detail, I have shown therein, as an example of one form in which the invention may be embodied, a seat support suitable for use in long-distance freight-hauling trucks and the like, comprising, in general, a cylinder assembly A and a piston unit B cooperatively providing a seat-supporting pedestal; an auxiliary cushioning tank C mounted on the upper end of the piston unit B; and a dust-shield D interposed between the upper end of the piston unit B and the tank C.

Figure 3:
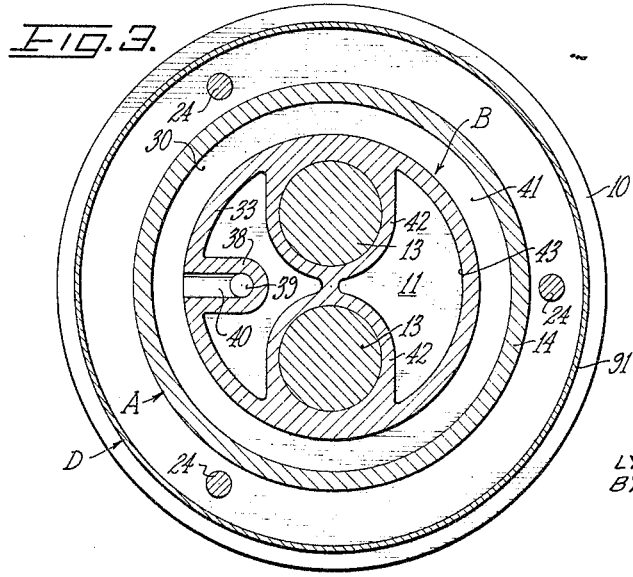
FIG. 3 is a transverse horizontal sectional view of the same taken on the line 3—3 of FIG. 1.

Cylinder A comprises a base plate 10 adapted to be bolted down or otherwise secured to the floor of a vehicle cab or other supporting platform and having an integral raised central portion 11 of circular peripheral contour provided with a pair of diametrically opposed bosses 12 in which respective upwardly projecting guide studs 13 are mounted in diametrically opposed relation on opposite sides of the vertical axis of the assembly (FIG. 3). Cylinder assembly A further includes a cylinder tube 14 in the lower end of which the raised portion 11 of base 10 is received and sealed thereto by an O-ring 15 mounted in an annular groove in its periphery. Cylinder tube 14 has a reduced upper end 16 snugly received in a counterbore in an annular cap flange 17 and sealed thereto by an O-ring 18 disposed in an internal annular groove therein. Flange 17 has a collar portion 19 of reduced diameter projecting radially inwardly over the upper end of cylinder tube 14 and provided with an internal annular groove in which is seated an O-ring 20 for sealing the cylinder to the piston unit B. In the periphery of flange 17 is an annular groove in which is seated a dust ring 21 for sealing the upper chamber within shield D against the entry of dust. Collar portion 19 has an upwardly-projecting cylindrical neck 22 provided with a shallow cylindrical internal groove in which is contained a cylindrical bearing bushing 23 of Teflon or equivalent wear-resistant low friction bearing material. A plurality of tie bolts 24 are anchored at their lower ends in the base 10, project upwardly through respective bores in flange 17, and are threaded into nuts 25 whereby the assembly of base 10, cylinder tube 14 and head flange 17 is secured.

Piston unit B comprises a flat annular piston 30 having a peripheral annular groove 31 in which is mounted an O-ring 32 sealed to the cylindrical inner wall of cylinder tube 14. An integral tubular connecting rod 33 projects upwardly from piston 30 and terminates at its upper end in a head 34 which is formed with a reentrant cylindrical cup shaped boss 35 at its center. A plurality of circumferentially spaced internally threaded bolting bosses 36 (FIG. 1) and a fitting boss 37 are formed integrally with the head 34 and the tubular cylindrical lateral wall of the connecting rod 33, the boss 37 being continued downwardly in the form of an integral bead 38 extending axially along the cylindrical wall of connecting rod 33 and having a transfer air passage 39 extending longitudinally therein. A radial port 40 provides communication between the lower end of passage 39 and a rebound compression chamber 41 which is defined between the exterior of the connecting rod 33 and the cylinder 14. The upper and lower ends of chamber 41 are sealed respectively by the O-rings 20 and 32, whereby the sole path for flow of air into and out of chamber 41 is through the passage 39.

Piston unit B further includes a pair of guide bushings 42 integrally joined to the cylindrical side wall of connecting rod 33 and to the interior of piston 30 in diametrically opposed relation on opposite sides of the piston axis and slidably receiving the guide studs 13, thereby providing for guided vertical movements of the piston unit B while maintaining it rotationally fixed with respect to the cylinder assembly A so as to prevent any oscillation of the supported seat about the vertical axis of its cushioning support. The studs 13 also function to provide a minor amount of cushioning piston action in the interior chamber 43 defined between the base 10 and the piston head 34 within the confining tubular connecting rod 33.

Auxiliary cushioning tank C comprises a circular central crown wall 50 and a top wall 51 disposed in respective vertically spaced horizontal planes and integrally connected by tubular bosses 52 which register with the piston head bosses 36, and a boss 57 which registers with piston head boss 37. The top wall 51 projects radially outwardly beyond the crown wall 50 to join the outer wall of a pair of concentric, radially-spaced cylindrical skirt walls 53 and 54 depending from the circular peripheries of the crown wall 50 and top wall 51, respectively. A bottom web 55 bridges radially between and joins the skirt walls 53, 54. Defined within the tank C is an auxiliary cushioning chamber 56 the major volume of which is disposed within the depending annular skirt portion of the tank defined between skirt walls 53. A relatively shallow central portion of the chamber extends over the crown wall 50 and around the bosses 52 and 57.

Relatively unrestricted direct communication between the internal chamber 43 and the tank chamber 56 is provided for by a coupling nipple 58 respective end portions of which are mounted in the boss 35 of piston head 34 and in a boss 59 formed in the center of crown wall 50 of the tank. The respective ends of nipple 58 are provided with peripheral annular grooves in which are seated O-rings 60 which seal the respective ends of the nipple to the piston head and to the tank C respectively. A passage 61 is provided through the bosses 35 and 59 and through the nipple 58.

The rebound chamber 41 around the connecting rod 33 is isolated from any direct connection with the inner chamber 43 but is connected to the auxiliary cushioning chamber 56 by the following means: a nipple fitting 65 is threaded into the boss 37 and has a cylindrical head portion 66 which is received in a counterbore within boss 57 and is sealed thereto by an O-ring 67. A radial passage 68, formed in an integral elongated radial boss 69 on the underside of top wall 51, communicates with the nipple fitting 65 through a port 70. The outer end of bore 68 is closed by a plug 71. Near said outer end, a vertical bore 72 intersects and communicates with the radial bore 68 and extends downwardly into an enlarged outer end portion 73 of boss 79, terminating in a port 74 of reduced diameter, a valve seat shoulder 75 being defined between the port 74 and the bottom of bore 72. The upper end of vertical bore 72 is closed by a plug 80. A ball check valve 76 is normally seated on the valve seat 75 to close the lower end of bore 72. A horizontal bleed port 77 and aligned counterbore 78 intersect the vertical bore 72. Bleed port 77 is restricted by a needle valve 79 which is threaded into counterbore 78 and has a valve tip closely fitted into the port 77. Adjustment of needle valve 79 provides for variable restricted bleed of air from vertical bore 72 into auxiliary cushioning chamber 56. Thus, during a rebound stroke, in which piston 30 moves upwardly, applying compression to the air within rebound chamber 41, when the pressure in that chamber is increased above the pressure in tank chamber 56, a restricted escape of air from the rebound chamber 41 through port 40, vertical passage 39 and coupling fitting 65 into radial passage 68 and thence through vertical bore 72 and bleed port 77 into the tank chamber 56, will occur at a controlled rate depending upon the setting of needle valve 79.

A suitable inlet fitting 81 is threaded into a boss in bottom web 55 of tank C to provide for coupling an air pump to the tank for pumping air into the tank until a predetermined pressure is established therein. The pressure differential in the tank C over atmospheric pressure, in the normal at-rest condition (not subject to road shock or rebound) of the apparatus, loaded by 200 pounds of load, may be approximately 4 pounds per square inch.

Plug 80 may be removed for adding lubricating oil into the bore 72, from which it may flow through passage 68, fitting 65, passage 39 and port 40 into the rebound chamber 41 to lubricate the inner wall of cylinder tube 14. A seat-mounting plate 83 is mounted upon the flat top wall 51 of the tank and may have end portions projecting beyond the periphery of the tank, for attachment to a seat as illustrated in my pending application Ser. No. 385,215, filed July 27, 1964, now Patent No. 3,235,308, for adjustable seat apparatus. A plurality of bolts 84, with their lower ends anchored in the bosses 36, project upwardly through the bridging bosses 52 of the tank and through the mounting plate 83. Nuts 85, threaded onto the upper ends of bolts 84, secure the mounting plate and the tank to the piston head 34.

Dust shield D is of inverted bowl-form, including a crown portion 90 clamped between the piston head 34 and the crown wall 50 of tank C, and a cylindrical skirt 91 depending around the cylinder assembly A and sealed to flange 17 by means of dust-ring 21 as previously described. Thus the joint between connecting rod 33 and the cap flange 17 of the cylinder assembly, where the connecting rod 33 emerges therefrom, is sealed against the entry of dust which might otherwise collect on the outer surface of the connecting rod 33, deteriorating the smooth sliding action of the connecting rod in the cylinder assembly.

In FIG. 1 the apparatus is shown with the piston in its lowermost position before air under pressure has been introduced through inlet fitting 81. When air is charged into the system, the piston 30 will be spaced from the base plate 10 by an amount desired by the operator so that his eyes stay at a desired level to observe the road. With the piston spaced from the base plate and a pressure of air of any desired amount, depending upon the proportion of the parts, particularly the proportions of the pistons, and the weight of the driver and his desired eye level, when a bump in the road is encountered the base 10 and the cylinder assembly A move upwardly with reference to the piston unit B. In general the weight of the driver is carried on the piston and the piston is supported on a cushion of air under pressure. This supporting pressure or force is the pressure of air multiplied by the area of the piston. In encountering road shocks, the piston should be considered relatively stationary (notwithstanding its upward and downward movements) while the cylinder assembly moves with reference to it. An upward movement of the cylinder enlarges the rebound space 41 decreasing the pressure therein. This decrease in pressure extends through passages 40, 39 and 68 to the check valve chamber. Simultaneously with the upward movement of the base 10, there is an increase in pressure in chamber 43 and tank 56.

During a momentary interval the check valve 76 opens due to the increased pressure in space 43 and tank 56. Flow of air is then into the rebound chamber 41. As soon as the pressures are equalized, the check valve 76 closes trapping air, at the equalized higher pressure, in rebound chamber 41. This trapped air acts as a buffer or brake on the movements of the seat and its occupant smoothing out the oscillations caused by the vehicle traveling over a bumpy road. When the vehicle strikes a depression the action is the opposite.

It will be apparent that the pressure in space 43 and tank 56 on the one hand and in the rebound space 41 on the other are substantially always varying and opposite to each other. Thus the pressure in rebound space 41 is always acting to smooth or dampen out the effect of oscillations of the vehicle suspension on the seat and its occupant.

Whenever the pressure in the rebound space 41 is equal to or higher than the pressure in the tank 56 and its connected passages, the check valve 76 is closed. Thus, when the pressure in the trapped rebound space is high, the force opposing movement of the seat due to movement of the base 10 is high. The value of the pressure in the rebound space to some extent is controlled by needle valve 79. The needle valve is readily adjustable by the operator to obtain the ride conditions he wishes. In general, opening the needle valve permitting more free flow of air from the rebound chamber 41 into tank 56 decreases the resistance to movement of the seat as the vehicle rolls over road irregularities.

It will now be seen that the invention provides an operation wherein the response of the apparatus to a road shock will be one in which the upwardly-impelled cylinder assembly A will at first move freely and rapidly upwardly around the piston assembly B without transmitting the shock to the seat, the shock being gradually absorbed by the soft cushioning action provided by the relatively large cushioning volume provided by the chambers 43 and 56 combined, with relatively unrestricted transfer of air from chamber 43 to chamber 56 during the shock-absorbing operation, and with equally free and rapid equalization of pressure between tank chamber 56 and rebound chamber 41 as lowered pressure is produced in the latter by the downward movement of piston 30 in the cylinder; whereas on the other hand, at the very beginning of rebound movement, compression will immediately be developed in the rebound chamber 41 over the previously equalized pressure in tank chamber 56, and this pressure differential, opposing the upward movement of piston 30, will be dissipated slowly through the restricted bleed port 77 with a dash-pot action which converts the rebound into a slow, sustained lifting of the seat back to its normal position by the compression that has been developed in chambers 43 and 56 by the shock absorbing stroke.

What is claimed is:

1. A cushioning pedestal support for seats comprising: a cylinder having a closed bottom including base means for mounting the same on a supporting surface with the cylinder projecting vertically upwardly therefrom and having at its upper end a radially inwardly projecting annular cylinder head; and a piston unit including an annular piston slidable within and sealed to the inner wall of said cylinder and a tubular connecting rod projecting upwardly from said piston and through said cylinder head and having at its upper end a head for supporting a seat, a road shock cushioning chamber being defined within said connecting rod between said connecting rod head and said closed bottom, and an annular rebound-checking pneumatic chamber being defined between said connecting rod and said cylinder and between said closed bottom and said cylinder head; said cushioning support further including a pair of parallel, laterally-spaced guide studs secured to said base means and a pair of bearing sleeves secured to the piston unit and slidably receiving said studs to hold said cylinder and piston unit against relative rotation about said major axis while permitting free vertical movement of said cylinder relative to the piston unit.

2. A pedestal support as defined in claim 1, wherein said studs are projected into said cushioning chamber during relative downward movement of said piston in said cylinder so as to add to the compression in said cushioning chamber.

3. A cushioning pedestal support for seats comprising: a cylinder having a closed bottom including base means for mounting the same on a supporting surface with the cylinder projecting vertically upwardly therefrom and having at its upper end a radially inwardly projecting annular cylinder head flange; and a piston unit including an annular piston slidable within and sealed to the inner wall of said cylinder and a tubular connecting rod projecting upwardly from said piston and through said cylinder head flange and having at its upper end a head for supporting a seat, a road shock cushioning chamber being defined within said connecting rod between said connecting rod head and said closed bottom, and an annular rebound-checking pneumatic chamber being defined between said connecting rod and said cylinder and between said closed bottom and said cylinder head flange.

4. A cushioning pedestal as defined in claim 3, including check valve means providing for free entry of air into said rebound-checking chamber during relative downward movement of said piston unit, and closing to trap air in said rebound-checking chamber during rebound.

5. A pedestal support as defined in claim 4, wherein said connecting rod has a diameter equal to a major part of the diameter of said cylinder, whereby the radial width of said rebound-checking chamber is relatively small in relation to the radius of said shock-cushioning chamber.

6. A pedestal support as defined in claim 5, further including a pair of parallel, laterally-spaced guide studs secured to said closed bottom and rising therefrom; and a pair of bearing sleeves within said connecting rod and slidably receiving said guide studs to hold said piston and cylinder against relative rotation about the vertical axis of said pedestal support while permitting free vertical movements of said piston relative to said cylinder.

7. A cushioning pedestal support for seats comprising a cylinder having a closed bottom including base means for mounting the same on a supporting surface with the cylinder projecting vertically upwardly therefrom and having at its upper end a radially inwardly projecting annular cylinder head flange; a piston unit including a piston slidable within and sealed to the inner wall of said cylinder and a connecting rod projecting upwardly from said piston and through said cylinder head flange and having at its upper end a head for supporting a seat, a primary road shock cushioning chamber being defined between said piston unit and said closed bottom, and an annular rebound-checking pneumatic chamber being defined between said connecting rod and said cylinder and between said closed bottom and said cylinder head flange; a pneumatic tank mounted on said piston head to provide an auxiliary road shock cushioning chamber; means providing a connecting passage for displacement of air from said primary cushioning chamber into said auxiliary chamber during relative downward movement of said piston; and means including a check valve providing a passage for free flow of air from said auxiliary chamber into said rebound-checking chamber during said relative downward movement and opposing return flow from said rebound-checking chamber to said auxiliary chamber during rebound.

8. A pedestal support as defined in claim 7, including a restricted bleed in said last-mentioned passage, for retarded return flow of air from said rebound-checking chamber to said auxiliary chamber.

9. A pedestal support as defined in claim 7, wherein said tank includes a major volume portion projecting laterally beyond said piston rod head and a shallow central portion mounted upon said piston rod head and providing a mounting for said seat.

10. A pedestal support as defined in claim 7, wherein said tank includes a major volume portion of annular circular form projecting laterally beyond said piston rod head and a shallow central portion mounted upon said piston rod head and providing a mounting for said seat.

11. A pedestal support as defined in claim 7, including means for receiving air under compression into said tank.

12. A pedestal support as defined in claim 7, including a needle valve providing an adjustable restricted bleed in said last-mentioned passage, for retarded return flow of air from said rebound-checking chamber to said auxiliary chamber.

References Cited by the Examiner

UNITED STATES PATENTS

| 1,856,691 | 5/1932 | Carter | 297—71 |
|---|---|---|---|
| 1,951,375 | 3/1934 | Scharvghopf et al. | 297—71 |
| 2,879,829 | 3/1959 | Lavoie et al. | 267—1 |
| 3,143,332 | 8/1964 | Watlington | 297—347 |
| 3,188,136 | 6/1965 | Redfield et al. | 297—71 |

ARTHUR L. LA POINT, *Primary Examiner.*

R. M. WOHLFARTH, *Assistant Examiner.*